April 6, 1926.
J. L. KELLOGG
AMUSEMENT AND ADVERTISING DEVICE
Filed July 28, 1922
1,579,867
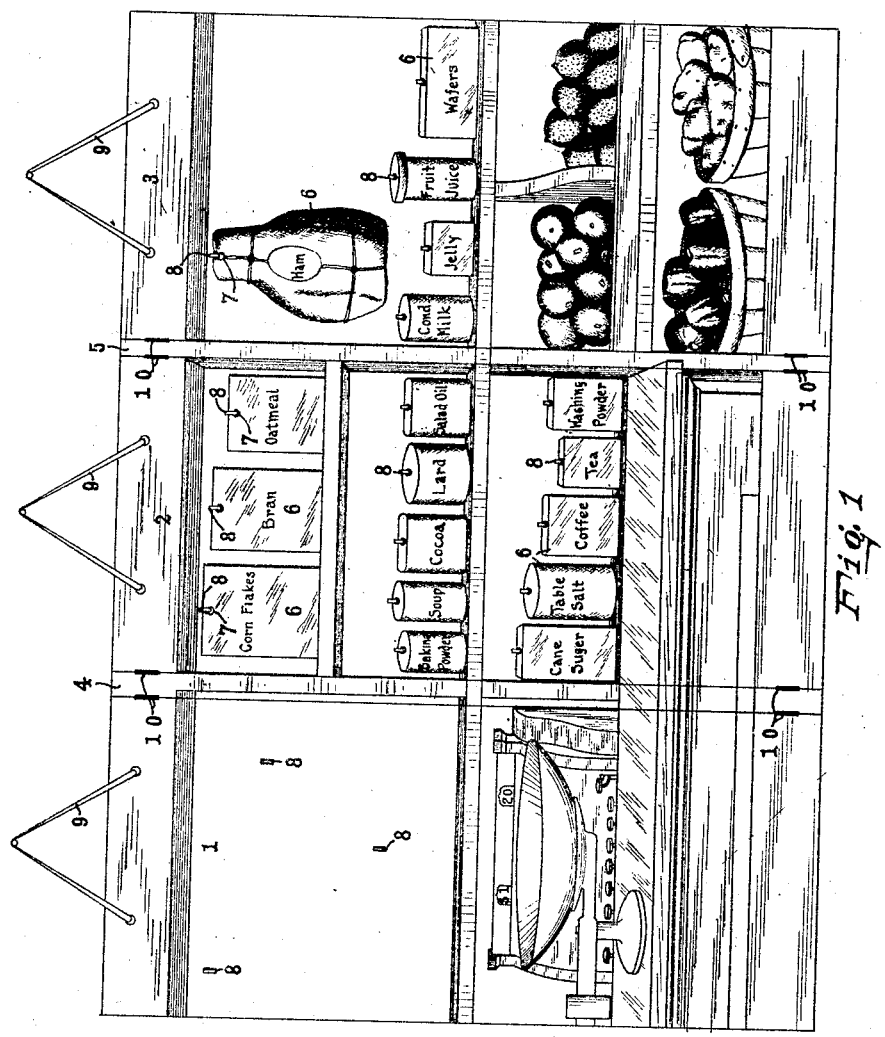
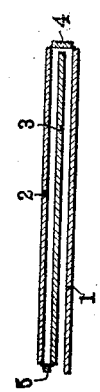
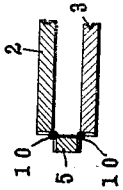
INVENTOR
John L. Kellogg.
BY
Duell, Warfield & Duell
ATTORNEY Patented Apr. 6, 1926.

1,579,867

UNITED STATES PATENT OFFICE.

JOHN LEONARD KELLOGG, OF BATTLE CREEK, MICHIGAN, ASSIGNOR, BY MESNE ASSIGNMENTS, TO KELLOGG COMPANY, OF BATTLE CREEK, MICHIGAN, A CORPORATION OF DELAWARE.

AMUSEMENT AND ADVERTISING DEVICE.

Application filed July 28, 1922. Serial No. 578,193.

*To all whom it may concern:*

Be it known that I, JOHN L. KELLOGG, a citizen of the United States, residing at Battle Creek, in the county of Calhoun and State of Michigan, have invented certain new and useful Improvements in Amusement and Advertising Devices, of which the following is a full, clear, and exact description, such as will enable others skilled in the art to which it appertains to make and use the same.

This invention relates to devices combining features of toys, educational devices, and advertising mediums.

It is an object of this invention to provide an improved form of device by which merchants and manufacturers may attract attention to their goods and acquaint prospective buyers with their brands in an attractive and interesting manner. By this invention there may be displayed simultaneously and in very little space a great variety of goods in a manner inexpensive to the manufacturer or merchant and effective in displaying their wares before the public. The device is adapted to disclose the nature of articles which the manufacturer makes, and the variety of wares kept by the shopkeeper, and is also adapted to be used as an educational plaything by customers and their children upon whom the desired impression is to be made. The device is also adapted to act as a substitute for advertising devices such as calendars, placards and the like, which are expensive, occupy a great deal of space, and for a variety of reasons may be inefficient in producing the desired effect.

Another object of the invention is to provide a device of this character which may be employed to inform persons with respect to articles of merchandise, their names, prices, brands and other features in a manner designed to interest and amuse as well as to instruct and educate in the art of buying and selling.

Another object of the invention is to provide an improved form and arrangement of parts for a device of this character which, although compact and portable, simulates a store in those characteristics useful to the ends above described.

Another object of the invention is to provide a toy or educational device in the form of a model of a store reproduced on a flat surface and which is durable, and convenient to use.

Other objects will be in part obvious and in part pointed out hereinafter.

The invention accordingly consists in the features of construction, combinations of elements and arrangements of parts which will be exemplified in the construction hereinafter set forth, and the scope of their application will appear in the appended claim.

For a more complete understanding of the nature and advantages of this invention reference should be had to the following detailed description, which describes the best illustrative embodiments of this invention at present known to me, taken in connection with the accompanying drawing, in which:

Figure 1 is a front view of a model store embodying the features of the invention and expanded to indicate the manner of its use;

Fig. 2 is an edgewise view of the device showing the manner in which it may be folded when not in use; and Fig. 3 is an edgewise view of the device showing the folded joint in detail.

Referring to the drawings, a pictorial representation of a section of the interior of the store is reproduced on a flat surfaced panel. This panel may be and preferably is formed of a plurality of sections 1, 2 and 3 which are joined together with strips 4 and 5 interposed therebetween so as to form a foldable arrangement. The pictorial representation, as here shown, may include the counter, shelves, and bins which support the articles of merchandise ordinarily found in a store, such as a grocery store pictured in the drawing. There may also be shown, in order to carry out the more complete likeness of the store, a cash register, scales and other devices. The articles of merchandise are themselves preferably not shown in the picture as above described but are adapted to be removably placed thereon. These articles are pictorially represented on separate supplementary pieces of cardboard or similar material in the form of plates or cards 6 and are each provided with a small hole 7 so disposed that when suspended from the hole they assume an upright position. The articles of merchandise simulated by the cards 6 are adapted to be placed on the shelves or bins, as it were, by hooking them by means of the aperture 7 on suitably disposed hooks 8 which are arranged in position on the sections 1, 2 and 3 of the main supporting panel, so that the articles when hooked thereon appear to be actually in place upon the shelves, counter, bins or other support. The hooks 8 may be of considerable length so as to accommodate a number of simulation articles of merchandise on each hook, thereby increasing the capacity of the store so to speak.

In employing this device as a game or toy, the articles of merchandise simulated by cards 6 are placed in position and are removed therefrom by the person assuming the duties of storekeeper for sale to the buyer. Imitation paper money may be employed if desired so that purchases and change can be made, teaching children not only how to purchase goods but how to make change. The device may be used to teach persons the prices of various articles of merchandise and also the prices of certain brands of goods. For this purpose the cards 6 may be provided with facsimiles of labels of various brands of goods whereby children may be taught to distinguish certain brands and to be undeceived by unscrupulous shopkeepers. By a little practice, the distinguishing marking and the prices of such goods will be easily memorized, such knowledge being a very desirable asset.

As an advertising medium to acquaint persons with the new brands of goods put on the market, a description of the contents of the packages as shown on the cards may be printed on the reverse side thereof together with the prices, the food values, and other information valuable not only in the education of children but to housekeepers. It is contemplated that the cards 6 may represent the articles manufactured by a number of different firms, each firm contributing to the expense of making and distributing the device and each being assured of the space allotted for the display of its goods.

In employing this device, the main background or panel comprising sections 1, 2 and 3 may be hung vertically on the wall by means of tapes 9 looped over nails or hooks set in the wall or it may be leaned against the wall. When not in use, the sections 1, 2 and 3 may be folded together as shown in Fig. 2 and for this purpose the strips 4 and 5 are made of unequal width so that, when folded at the hinges 10 there is no binding at the joints so formed.

Thus by the above arrangement are accomplished among others the objects hereinbefore referred to:

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent, is:

A device of the character described, including, in combination, a panel provided with representations of shelves, some of the shelves showing the representation of the upper surfaces thereof in perspective and one or more shelves showing the representation of the lower surface thereof in perspective, supports connected with said panel and arranged at varying distances above the representation of said shelves, and a special representation of an article detachably connected with each of said supports, the location of each support and the proportion of each article to be applied thereto being such that the lower end of such representation article occupies its proper position in connection with the representations of the said shelves, the lower ends of the representations of said articles which are to be combined with the upper shelf being straight, and the lower edges of the representations of the lower articles being so shaped and arranged as to create the illusion that the eye is looking at them in perspective from above.

In testimony whereof I affix my signature.

JOHN LEONARD KELLOGG.